(12) United States Patent
Leiteritz et al.

(10) Patent No.: US 8,772,668 B2
(45) Date of Patent: Jul. 8, 2014

(54) PLASMA TORCH AND TORCH HANDLE HAVING ERGONOMIC FEATURES

(75) Inventors: Nathan Gerald Leiteritz, Little Chute, WI (US); Stefan Giessler, Wettenberg (DE); David Paul Marcusen, Hortonville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 31 days.

(21) Appl. No.: 13/213,910

(22) Filed: Aug. 19, 2011

(65) Prior Publication Data

US 2013/0043223 A1 Feb. 21, 2013

(51) Int. Cl.
*B23K 10/00* (2006.01)
*H05H 1/26* (2006.01)

(52) U.S. Cl.
CPC .................................... *H05H 1/26* (2013.01)
USPC ................................ 219/121.48; 219/121.39

(58) Field of Classification Search
CPC .................................. B23K 10/00; H05H 1/26
USPC ............. 219/121.36, 121.39, 121.44, 121.48, 219/121.45, 121.5
See application file for complete search history.

(56) References Cited

U.S. PATENT DOCUMENTS

| 4,896,016 | A | 1/1990 | Broberg et al. |
| 4,954,688 | A | 9/1990 | Winterfeldt |
| 5,208,441 | A | 5/1993 | Broberg |
| 5,310,988 | A | 5/1994 | Couch, Jr. et al. |
| 5,726,415 | A | 3/1998 | Luo et al. |
| 5,819,594 | A * | 10/1998 | Sjovall .......................... 74/551.9 |
| 5,893,985 | A | 4/1999 | Luo et al. |
| 5,965,045 | A | 10/1999 | Zigliotto |
| 6,207,923 | B1 | 3/2001 | Lindsay |
| 6,215,090 | B1 | 4/2001 | Severance, Jr. et al. |
| 6,399,913 | B1 * | 6/2002 | Sammons et al. .............. 219/75 |
| 6,424,082 | B1 | 7/2002 | Hackett et al. |
| 6,472,631 | B1 | 10/2002 | Eickhoff et al. |
| 6,614,001 | B2 | 9/2003 | Hackett et al. |
| 6,852,943 | B2 | 2/2005 | Eickhoff et al. |
| 6,956,184 | B2 * | 10/2005 | Blide ............................. 219/132 |
| 6,998,566 | B2 | 2/2006 | Conway et al. |
| 7,005,600 | B2 | 2/2006 | Conway et al. |
| 7,105,770 | B2 | 9/2006 | Griffin et al. |
| 7,132,619 | B2 | 11/2006 | Conway et al. |
| 7,300,277 | B2 * | 11/2007 | Foos et al. ..................... 431/345 |
| 7,381,924 | B2 * | 6/2008 | Stein et al. ............... 219/137.62 |
| 7,446,280 | B2 * | 11/2008 | Zamuner .................. 219/137.31 |
| 7,582,844 | B2 | 9/2009 | Horner-Richardson et al. |
| 7,762,830 | B2 | 7/2010 | Roberts |
| 7,767,934 | B2 * | 8/2010 | Christopher et al. ...... 219/137.7 |
| 2009/0039059 | A1 | 2/2009 | Twarog et al. |

OTHER PUBLICATIONS

International Search Report & Written Opinion for application No. PCT/US2012/051273 mailed Dec. 12, 2012.

(Continued)

*Primary Examiner* — Mark Paschall
(74) *Attorney, Agent, or Firm* — Fletcher Yoder P.C.

(57) ABSTRACT

A plasma torch having a torch handle is provided. The plasma torch handle may be formed from a soft material and a hard material. Additionally, the plasma torch handle includes a thumb contour formed from the soft material and a finger contour formed from the soft material. In one embodiment, the plasma torch handle forms an angle of about 80° with the torch head. Plasma cutting systems having the plasma torch and handle are also provided.

14 Claims, 9 Drawing Sheets

(56) References Cited

OTHER PUBLICATIONS

Bosch: "Bosch Power Tools for DIY Full Range Catalogue for 2010", 2010, XP002687902, Retrieved from the Internet: URL:http://docs-eruope.electrocomponents.com/webdocs/1049/0900766b81049498.pdf [retrieved on Nov. 23, 2012], pp. 6, 8.

Nielsmiller: "New SpectrumR 625 x-TREME tm w/ XT40 Torch Delivers Big Cutting Power", Aug. 17, 2011, XP002687903, Retrieved from the Internet: URL:http://www.youtube.com/watch?v=24ih2Jarkqk [retrieved on Nov. 23, 2012] the whole document.

* cited by examiner

PLASMA TORCH AND TORCH HANDLE HAVING ERGONOMIC FEATURES

BACKGROUND

The invention relates generally to plasma cutting systems and, more particularly, to a plasma torch for such systems.

BRIEF DESCRIPTION

A plasma cutting system creates plasma (from high temperature ionized gas) to cut metal or other electrically conductive material. In general, an electrical arc converts a gas (e.g., compressed air) into plasma, which is sufficiently hot to melt the work piece while the pressure of the gas blows away the molten metal. The electrical arc is initiated in a plasma torch, and gas flows through the torch. A plasma torch is used to direct and control the plasma for cutting. As the tip of the torch is dragged across the work piece, the hot plasma cuts the work piece along that path of the torch tip.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
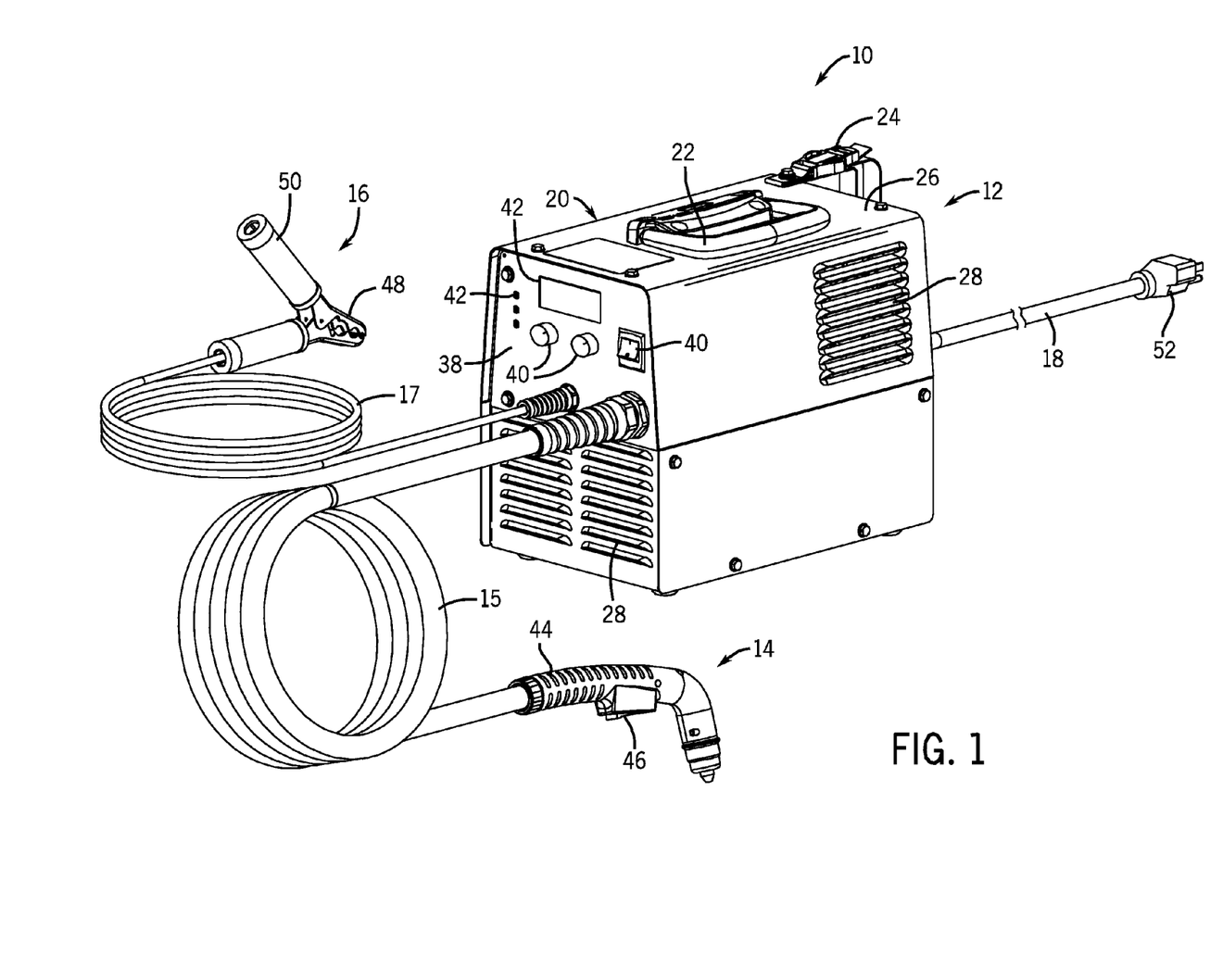
FIG. 1 is a perspective view of a plasma cutting system in accordance with embodiments of the present invention.

Referring now to the drawings, FIG. 1 is a perspective view illustrating an embodiment of a portable plasma cutting system 10. The illustrated plasma cutting system 10 includes a torch power unit 12 coupled to a plasma torch 14 and a work piece clamp 16 via a torch cable 15 and a work piece cable 17, respectively. As described further below in FIGS. 2-10, the plasma torch 14 may include various features that provide improved performance and durability, easier assembly and replacement of components of the torch 14, and longer usage life. The torch power unit 12 may be coupled to a power source (e.g., a power grid or a motor-driven generator) via a power cable 18. As described further below, the power source may provide a current to the torch 14 for starting and generating a pilot arc, and for maintaining plasma and a cutting arc. For example, the power unit 12 may be configured to supply a suitable voltage and current to create an electrical circuit from the unit 12, along the cable 15 to the torch 14, across a gap between the torch 14 and a work piece (e.g., as an electrical arc), through the work piece to the clamp 16, through the cable 17 back to the unit 12.

The power unit 12 includes an enclosure 20 defining a generally closed volume to support various circuits, sensor features, control features, and gas supply features (e.g., air compressor). For example, the system 10 may include sensors and controls to adjust the power unit 10 to account for various conditions, e.g., altitude, temperature, pressure, and so forth. The illustrated system 10 also may include a handle 22 on the top side of the enclosure 20 to enable easier transportation of the system 10. The illustrated system 10 also may include a latching mechanism 24 that may secure the torch 14, the cable 17, the clamp 16, and/or the power 18. The enclosure 20 may also include vents 28 to relieve heat and/or pressure inside the system 10. Additional vents may be located on other panels of the enclosure 20.

In the illustrated system 10, a control panel 38 is included at an end of the power unit 12. The control panel 38 may include various control inputs, indicators, displays, electrical outputs, air outputs, and so forth. In an embodiment, a user input 40 may include a button, knob, or switch configured to enable selection of a mode of operation (e.g., plasma cut, gouge, etc.), power on/off, an output current level, gas (e.g., air) flow rate, gas (e.g., air) pressure, gas type, a work piece type, a control type (e.g., manual or automatic feedback control), or a combination thereof. The control panel 34 may also include various indicators 42 to provide feedback to the user. For example, the indicators 42 may include one or more light emitting diodes (LED) and/or liquid crystal displays (LCD) to display on/off status, current level, voltage level, gas (e.g., air) pressure, gas (e.g., air) flow, environmental conditions (e.g., altitude, temperature, pressure, etc.), or any other parameter. Additionally, the indicators 42 may include an LED or LCD that displays a trouble or warning indicator if there is a problem with the system 10. Embodiments of the control panel 38 may include any number inputs and outputs, such as welding methods, air compressor settings, oil pressure, oil temperature, and system power.

Further, the user inputs 40 and indicators 42 may be electrically coupled to control circuitry and enable a user to set and monitor various parameters of the system 10. For example, the indicators 42 may display environmental conditions (e.g., altitude, temperature, pressure, etc.) that prompt a user to manually adjust the current, voltage, gas flow rate, gas pressure, or other operational parameters, or a combination thereof.

The plasma torch 14 includes a handle 44 and a trigger 46 with a guard, as well as various other components described below in FIGS. 2-9. The clamp 16 comprises an electrically conductive material clamping portion 48 having insulated handles 50. The power cable 18 includes a plug 52 for connection to a power source such as a wall socket or a motor-driven generator. The plug 52 may be configured to work with a variety of sockets or outlets, and the system 10 may receive different power sources, such as AC 50/60, Hz, 400, Hz, single or three phase 120V, 230V, 400V, 460V, 575V, any voltage in between such voltages, voltages exceeding the upper limit voltage, voltages below the lower limit voltage, and so forth.

Figure 2:
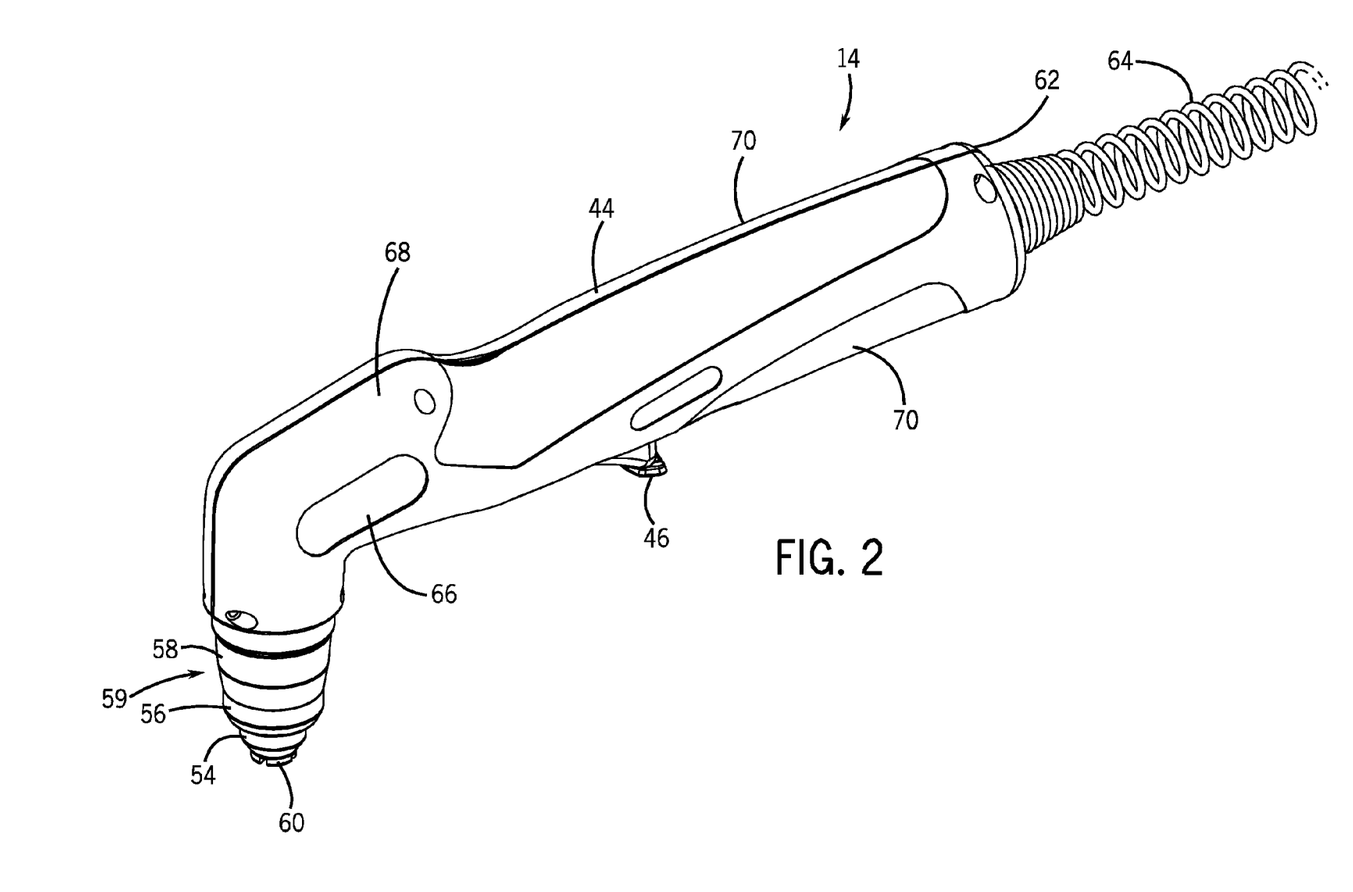
FIG. 2 is a side perspective view of a plasma torch in accordance with an embodiment of the present invention.

FIG. 2 depicts a side perspective view of the torch 14 in accordance with an embodiment of the present invention. As mentioned above, the torch 14 includes a trigger with guard 46 and a handle 44, the details of which are described further below. As shown in FIG. 2, the torch 14 also includes a drag shield 54, a retaining cup 56, and a torch body 58 extending into the handle 44. Together, these components 54, 56, and 58 may form and be located in the torch head 59. The torch 14 may also be described as having a torch tip 60 through which plasma flows during operation of the torch 14 and an end 62 for attaching the torch cable 15.

The torch 14 may include a strain relief component 64 secured to the end 62 of the torch 14. In some embodiments, the strain relief component 64 may enclose, be enclosed by, or be an integral portion of the torch cable 15. As shown in FIG. 2, in some embodiments the strain relief component 64 may be a spiraled or coiled material that relieves strain and reduces or prevents the likelihood of excessive flexing of torch cable 15 when the torch 14 is flexed relative to torch cable 15. In other embodiments, the strain relief component 64 may be a webbing over-molded onto torch cable 15, a solid flexible boot glued onto torch cable 15, or other suitable strain relief material.

The torch handle 44 may include a region 66 for marking and branding the torch 14. Additionally as described below, the torch handle 44 may be formed from two different materials: a hard material 68 and a soft material 70. The hard material 68 is relatively harder than the soft material 70 to provide durability and structural integrity of the torch handle 44. In contrast, the soft material 70 is relatively softer than the hard material 68 to increase operator comfort and provide improved (e.g., non-slip) grip for an operator.

Figure 3:
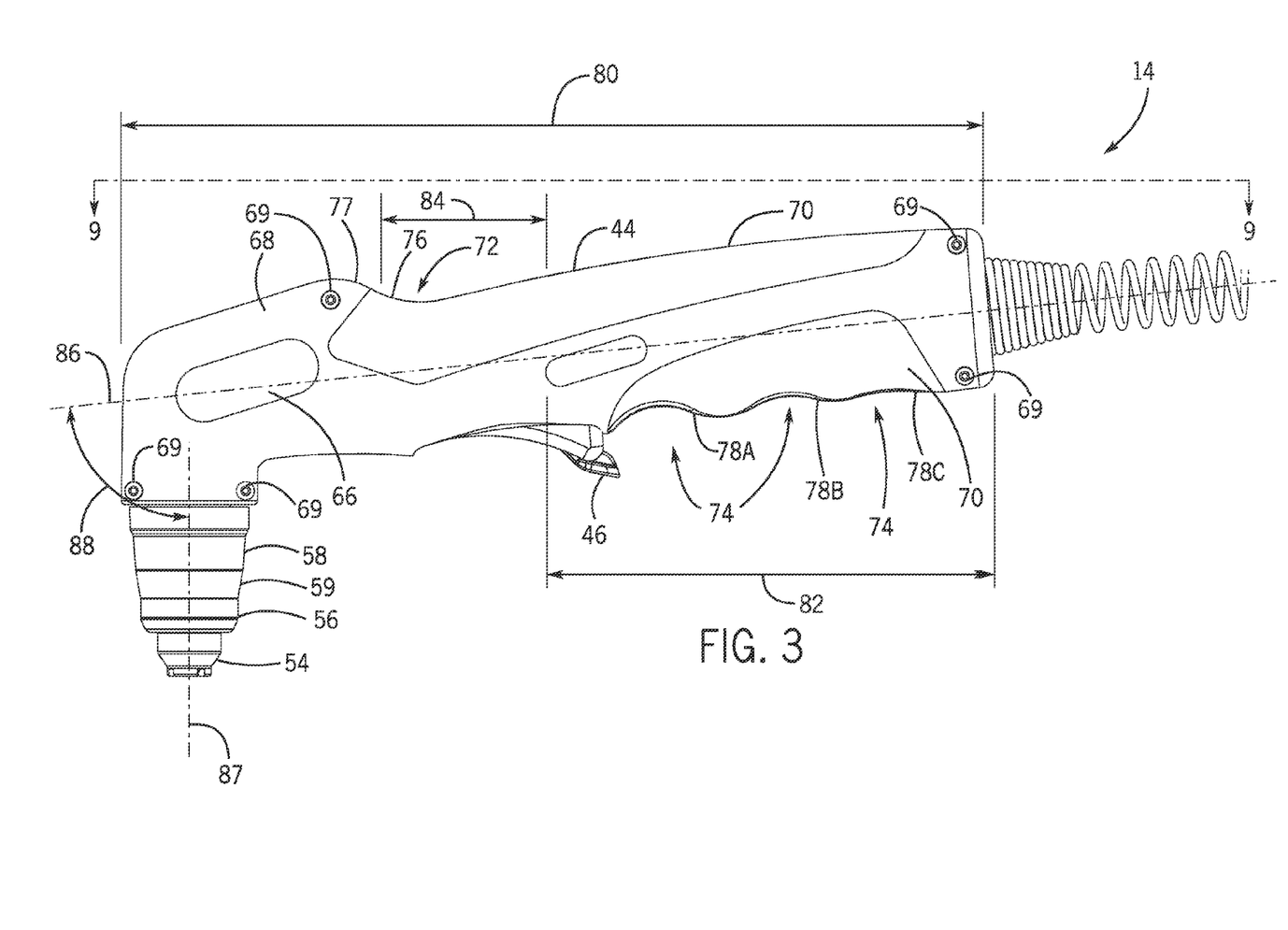
FIGS. 3 and 4 depict side views of the plasma torch of FIG. 2 in accordance with an embodiment of the present invention.
Figure 4:
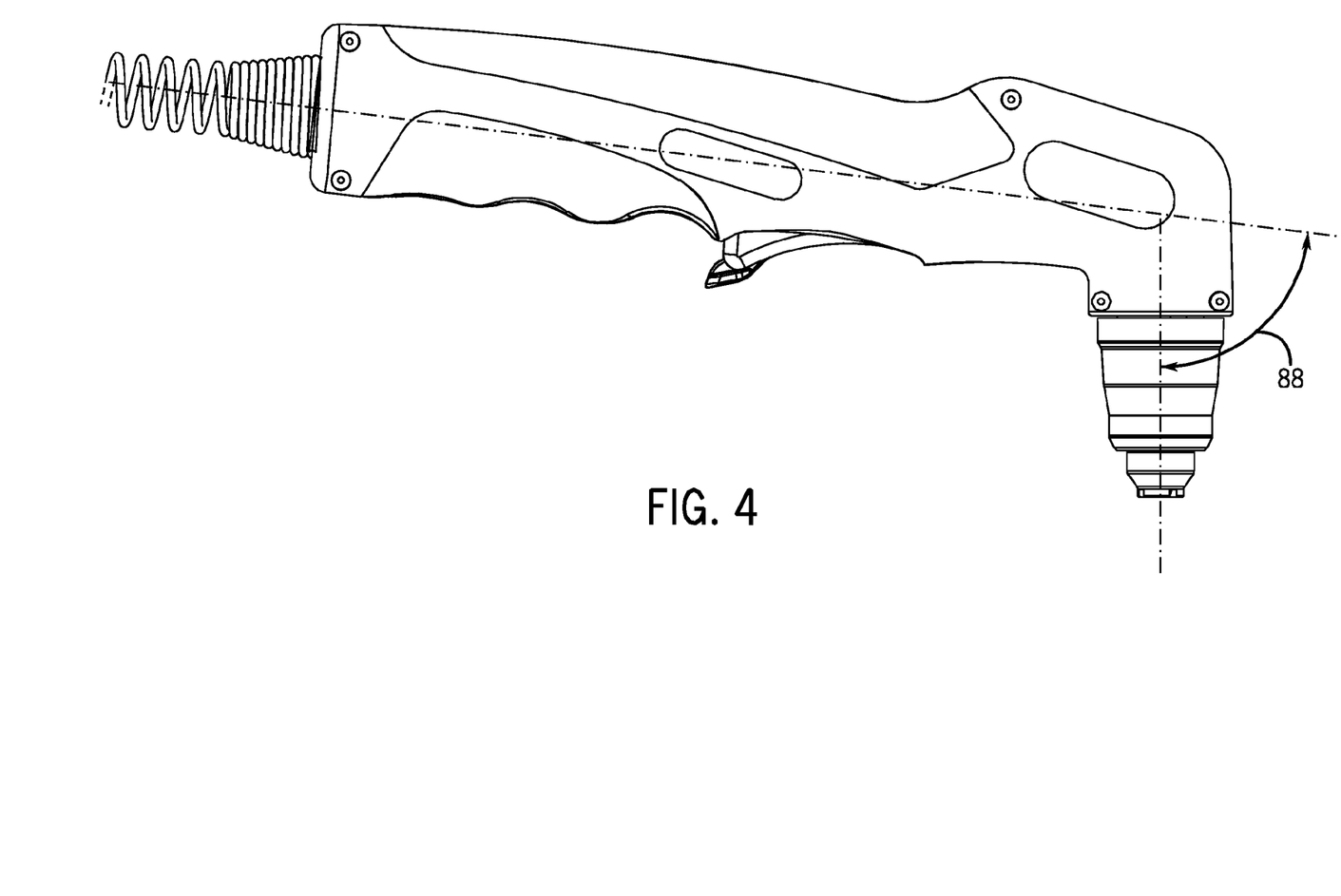

FIGS. 3 and 4 depict side views of the torch 14 in accordance with an embodiment of the present invention. FIG. 3 depicts those portions of the torch handle 14 having the hard material 68 and the soft material 70. For the example, the soft material 70 may form a thumb contour 72 of the torch handle 44 and a finger contour 74 of the torch handle 44. The thumb contour 72 may include a curved indentation 76 having a flared end 77 for placement of an operator's thumb. The finger contour 74 may include a plurality of curved indentations 78 for placement of an operator's fingers. Additionally, the curved indentations 78 may gradually decrease in size (e.g., length and/or depth) to receive different size fingers. For example, curved indentation 78A may be larger than curved indentation 78B, and curved indentation 78B may be larger than curved indentation 78C.

In one embodiment, the hard material 68 may be a thermoplastic material, and the soft material 70 may be a soft thermoplastic elastomer (TPE). Additionally, other characteristics of the materials 68 and 70 may be selected to aid in operation and identification of the torch 14. For example, the soft material may be a first color, (e.g., black), and the hard material 68 may be a second color (e.g., blue). In such embodiments, the colors of each material 68 and 70 may be selected to match a particular logo or branding, such as to match a logo placed on the region 66. In some embodiments, the torch handle 44 may be formed from two or more components that may be fastened together via fasteners 69, such as screws, nails, rivets, or any other suitable fastener or combination thereof.

FIGS. 3 and 4 also depict various dimensions of the torch 14. The torch handle 44 may have a length 80 (e.g., approximately 225, mm) as determined from the end 62. Additionally, the center of the trigger 46 may be located at a distance 82 (e.g., approximately 120, mm) from the end 62. Finally, the placement of the curbed indentation 76 may be defined at a distance 84 (e.g., approximately 20, mm) from the center of the trigger 46. In certain embodiments, the distances 82 and 84 may be selected to provide a "natural" placement of a thumb and index finger of an operator. In some embodiments, for example, multiple torch handles 44 may be provided having different distances 82 and 84 to accommodate different hand sizes. Additionally, the torch handle 44 may define a central longitudinal axis 86 and the torch head 59 may have a central longitudinal axis 87.

Additionally, the torch 14 may define a torch head angle 88 relative to the central longitudinal axis 86 of the torch handle 44. The torch head angle 88 may be selected to provide easier and optimal cutting performance while allowing a natural arm and elbow positioning. For example, in one embodiment the torch head angle 88 may be about 80°. In other embodiments, the torch head angle 88 may be about 71°, to about 89°. In combination with the thumb contour 72 and the finger contour 74 of the torch handle 44, the torch head angle 88 provides improved comfort and control of the plasma torch 14.

Figure 5:
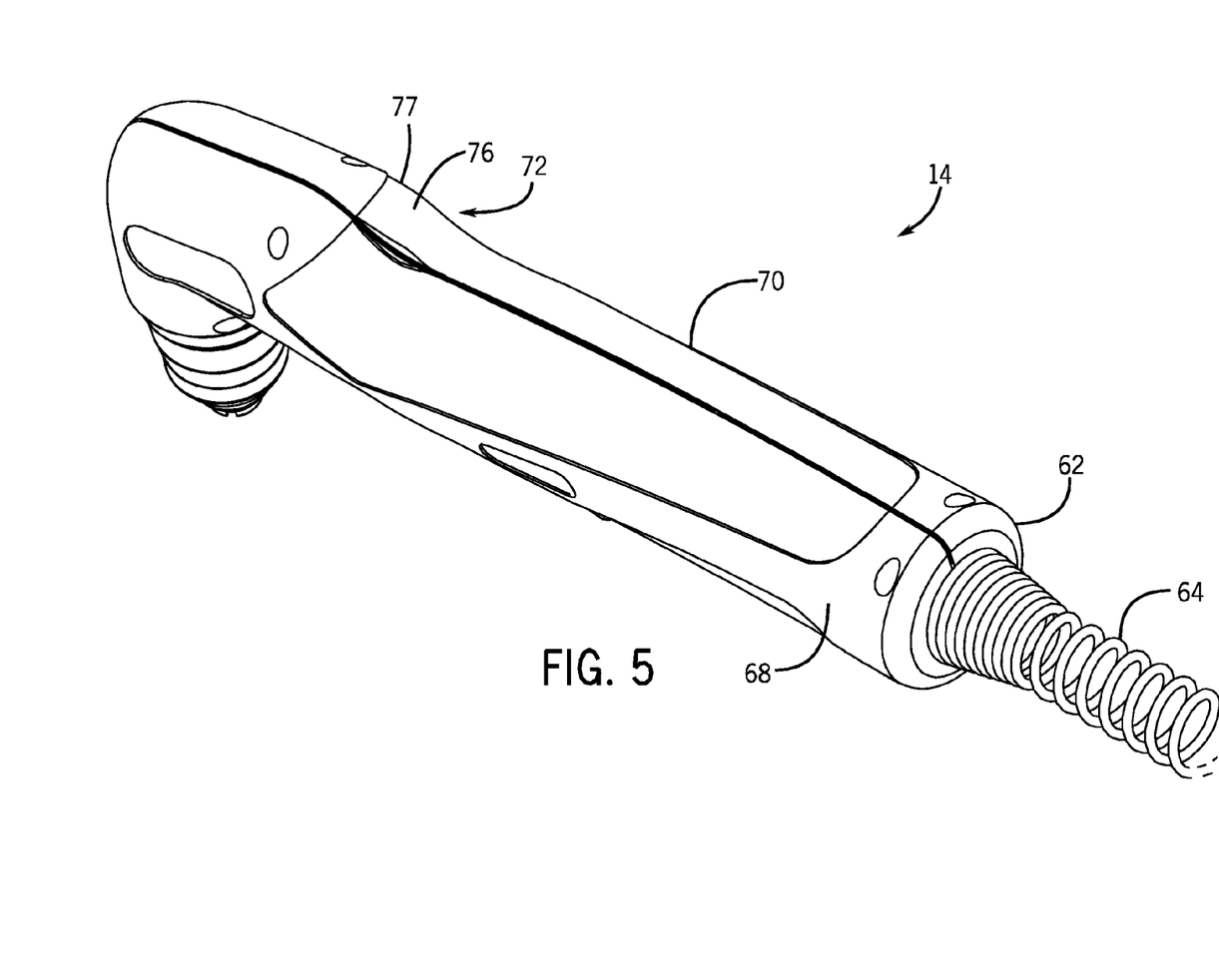
FIG. 5 is a rear perspective view of the torch of FIG. 2 in accordance with an embodiment of the present invention.

FIG. 5 is a rear perspective view of the torch 14 in accordance with an embodiment of the present invention. As shown in FIG. 5, the soft material 70 may extend over the top of the torch handle 44, such that the thumb contour 72 is formed from the soft material 70. Additionally, as also shown in FIG. 5, the curved indentation 76 and flared end 77 of the thumb contour 72 extend on both sides of back of the torch 14. As described further below, the torch 14 may be generally symmetrical and may thus be used by both right-handed and left-handed users.

Additionally, FIG. 5 shows attachment of the strain relief component 64 on the end 62 of the torch 14. In some embodiments, the strain relief component 64 may be overmolded with the torch handle 44, glued to the torch handle 44, or secured by any other suitable technique or combination thereof.

Figure 6:
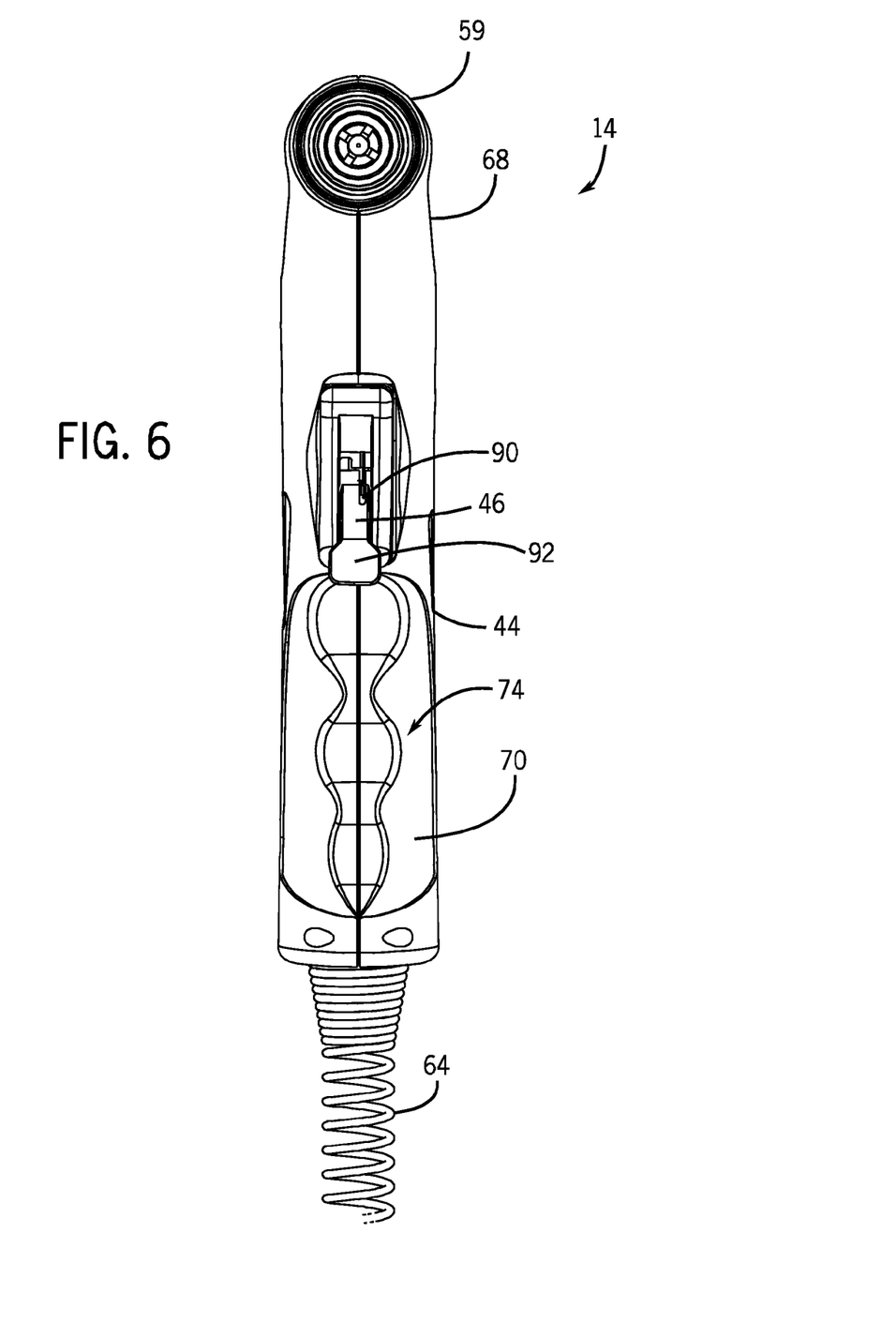
FIGS. 6 and 7 depict front and rear views respectively of the torch of FIG. 2 in accordance with an embodiment of the present invention.
Figure 7:
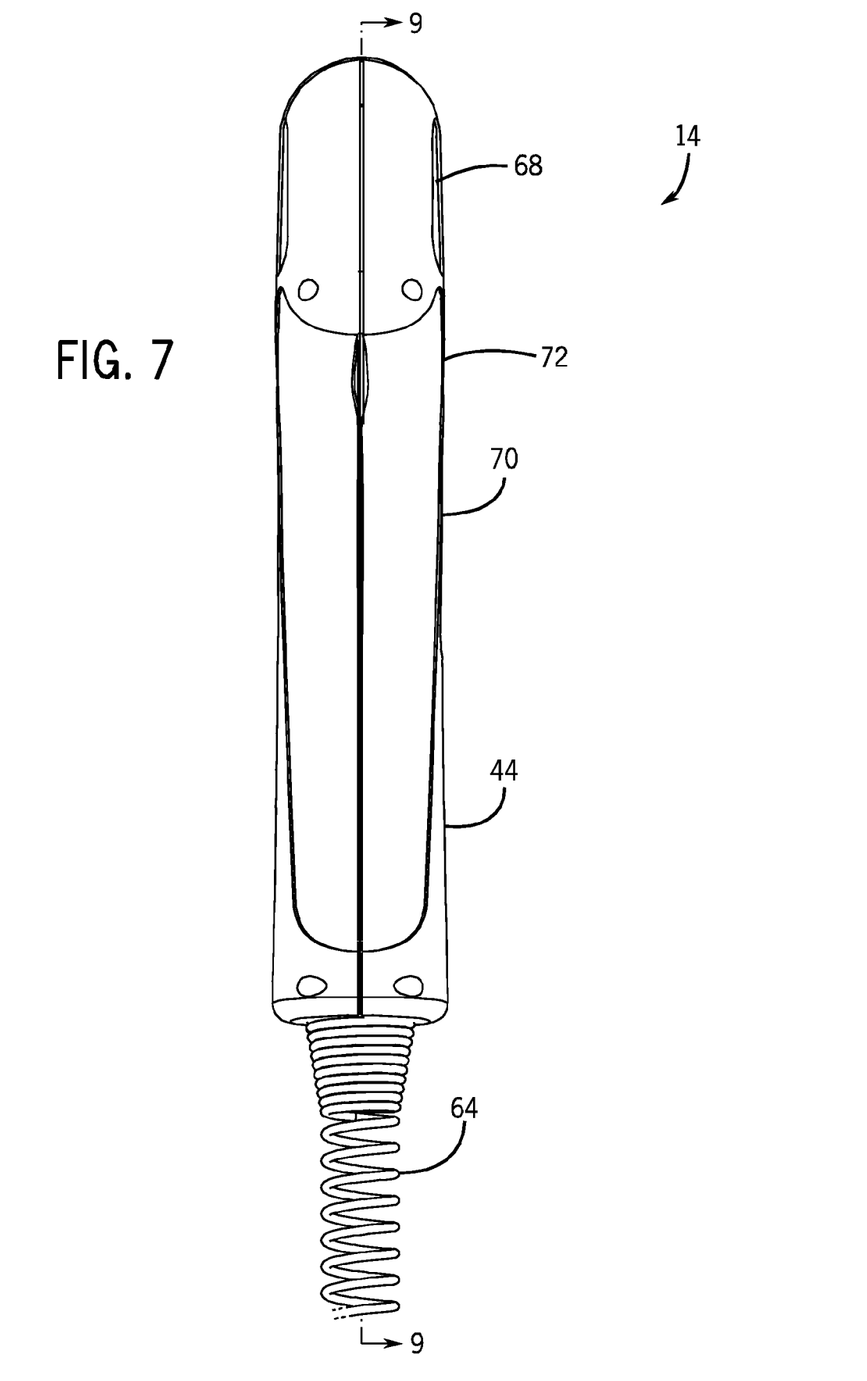

FIGS. 6 and 7 depict front and rear views respectively of the torch 14 in accordance with an embodiment of the present invention. As shown in FIG. 6, the torch 14 is generally symmetrical such that the torch 14 and the trigger 46 may be used in the right hand or left hand of an operator. The torch handle 44 includes a trigger orifice 90 through which the trigger 46 extends. The trigger 46 may include a guard mechanism 92, such as a guarding protrusion that may be moved from a first position to a second position to enable actuation of the trigger 46. For example, the trigger 46 may be disabled with guard mechanism 92 in a first position or enabled with guard mechanism 92 in a second position. As also shown in FIG. 6, the finger contour 74 extends on both sides of the front of the torch 14, such that the soft material 70 of the finger contour 74 is formed on both sides of the front of the torch 14. Accordingly, regardless of the use of the torch 14 in the right hand or left hand of an operator, the operator's fingers may rest in the finger contour 78 and on the soft material 70.

The rear view of the torch 14 depicted in FIG. 7 further illustrates the symmetry of the torch 14. As noted above, the thumb contour 72 extends on both sides of the rear of the torch 14, such that the soft material 70 of the thumb contour also extends in a similar manner. Thus, regardless of the use of the torch 14 in the right hand or left hand of an operator, the operator's thumb may rest in the thumb contour 72 and on the soft material 70.

Figure 8:
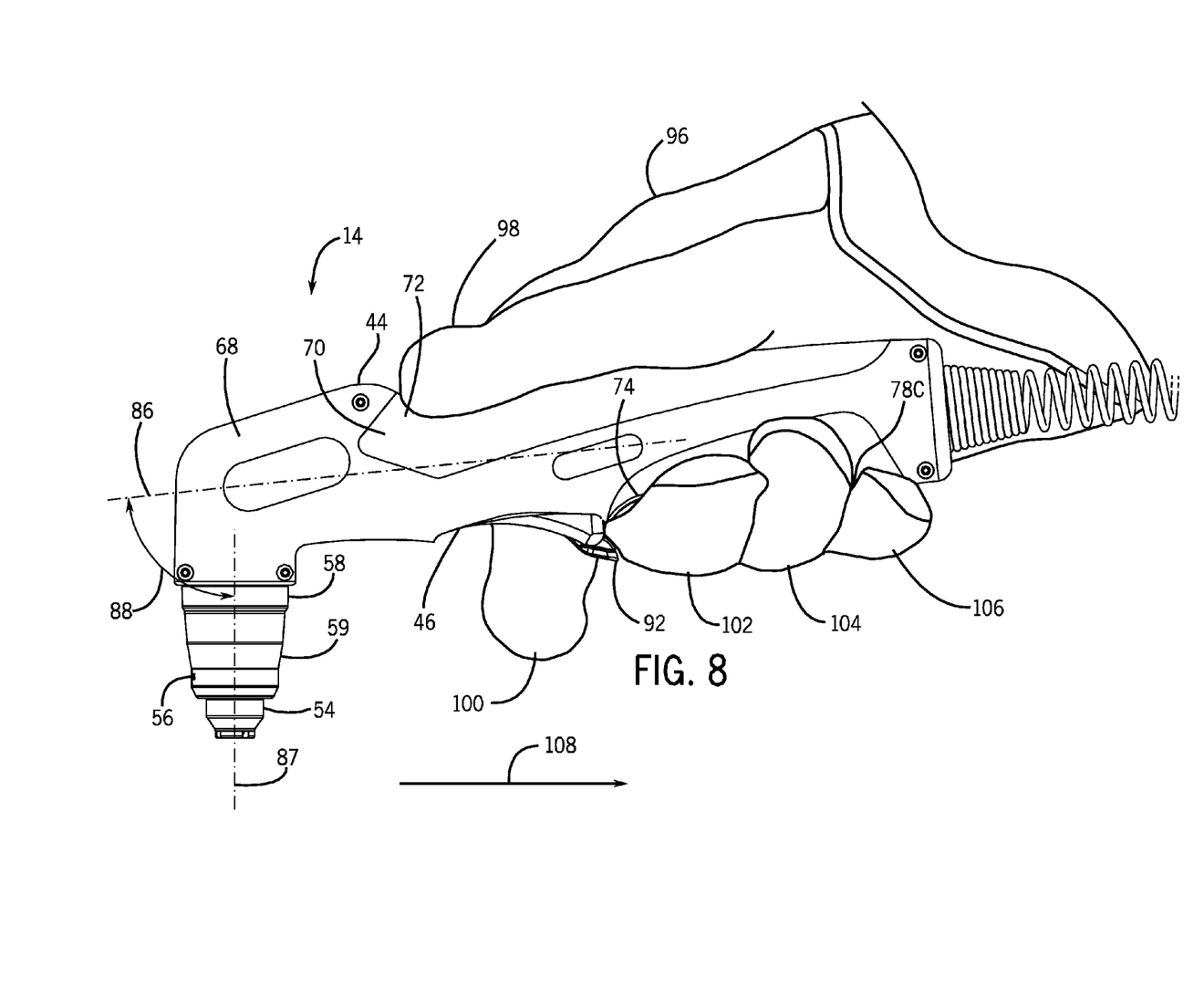
FIG. 8 depicts a usage of the torch of FIG. 2 in the hand of an operator in accordance with an embodiment of the present invention.

FIG. 8 depicts usage of the torch 14 in the hand 96 of an operator in accordance with an embodiment of the present invention. Although FIG. 8 depicts the torch 14 in the right hand of an operator, as described above, the torch 14 is symmetrical and may be used in either the right hand or the left hand of an operator.

FIG. 8 illustrates the general placement of a thumb 98 of the hand 96 and, the index finger 100, the middle finger 102, the ring finger 104, and the pinky finger 106. The thumb 98 of the hand 96 may be received in the thumb contour 70, such as in the curved indentation 74. The thumb 98 may thus abut the flared end 77. Additionally, as shown in FIG. 8, portions of the thumb 98 and the palms of the hand 96 may rest on the soft material 70 on the back of the torch 14.

Additionally, the index finger 100 may be positioned near the trigger 46 for operation of the torch 14. Each of the remaining fingers 102, 104, and 106 may be received by the finger contour 74. For example, the middle finger 100 may be received by contour 74A, the ringer finger 102 may be received by finger contour 74B (not shown), and the pinky finger 104 may be received by finger contour 74C.

Moreover, as shown in FIG. 7, the torch head angle 88 enables the operator to position the hand 96, and the arm and elbow of the operator, in a natural position during operation of the torch 14. For example, when the torch 14 is dragged across the work piece, such as in the direction indicated by arrow 108, the operator's hand 96 and corresponding arm and elbow may be moved and remain in the natural position prompted by the torch head angle 88 and the contours 72 and 74.

Figure 9:
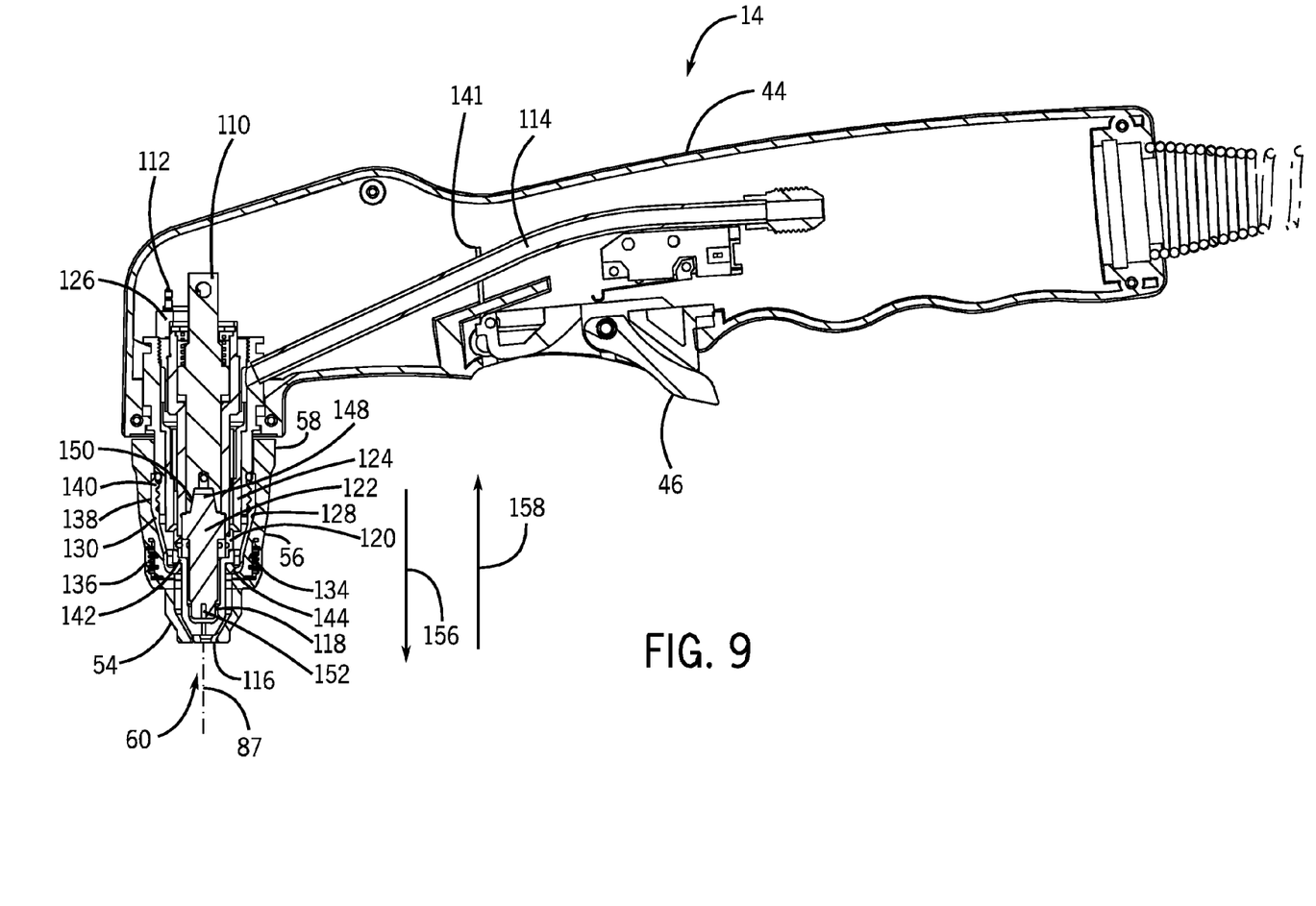
FIG. 9 depicts a cross-section taken along line 9-9 of FIG. 3 in accordance with an embodiment of the present invention.

FIG. 9 depicts a cross-section of the torch 14 taken along line 9-9 of FIG. 3 in accordance with an embodiment of the present invention. As mentioned above, the torch 14 includes the drag shield 54, the retaining cup 56 and the torch body 58. As further shown in FIG. 9, the torch 14 includes a plunger 110 (which may include an aperture capable of functioning as an electrical connection), a control connection 112 (for retaining the cup detection switch), and a gas connection 114. The drag shield 54 includes an orifice 116 located at the tip 60 of the torch 14. Additionally, various internal components of the torch 14 are shown in FIG. 9. The torch 14 may also include a nozzle 118, a swirl ring 120, an electrode 122, a cathode body 124, and a spring 126. Additionally, the retaining cup 56 includes an outer cup member 128 and an inner cup member 130. In some embodiments, the outer cup member 128 may be formed from plastic and the inner cup member 130 may be formed from a metallic material, such as brass.

The various components of the torch 14 may be concentrically aligned and centered with respect to the longitudinal axis 87 of the torch 14. Together, the drag shield 54, the nozzle 118, the swirl ring 120, and the electrode 122 may be referred to as "consumables." Some or all of these consumables may wear, i.e., be consumed, during operation of the torch 14, and an operator may replace these worn consumables during the lifetime of the torch 14. Accordingly, the plasma torch 14 provides for toolless replacement, e.g., removal and installation without tools, of the consumables. For example, as shown in FIG. 9, the drag shield 54 may include interior threads 134 for coupling to exterior threads 136 of the retaining cup 56. Thus, the drag shield 56 may be removed and installed through the disengagement and engagement of the threads 134 and 136. Similarly, the retaining cup 56 may include interior threads 138 for coupling to exterior threads 140 of the torch body 58. The torch handle 44 defines a generally hollow interior 141 for enclosing the components of the torch 14. For example, as shown in FIG. 9, the torch handle 44 may enclose the electrical connection 112 and the gas connection 114, and portions of the plunger 110 and the torch body 58.

As shown in FIG. 9, the nozzle 118 may include a shoulder end portion 142, and the inner cup member 130 of the retaining cup 56 includes an inner facing lip 144. Thus, the nozzle 118 may be retained by engagement of the inner facing lip 144 with the shoulder end portion 142. The swirl ring 120 may then be captured between an inner surface of the shoulder end portion 142 of the nozzle 118 and the cathode body 124. Finally, the electrode 122 may include a frustoconical portion 148 and the plunger 110 may include a frustoconical-shaped recess 150. Thus, the electrode 122 may be partially or fully received by the frustoconical portion 148 in the recess 150. Additionally, the electrode 122 may include an emissive insert 152, such as a hafnium insert.

Based on the features described above, each consumable of the plasma torch 14 may be toollessly removed. For example, by removing the drag shield 54 from engagement with the retaining cup 56, and removing the inner cup member 130 from engagement with the torch body 58, the nozzle 118 may be removed from the torch 14. After removal of the nozzle 118, the electrode 122 may be removed from the torch 14. The frustoconical portion 148 may form a self-releasing angle contact with the recess 150 of the plunger 110, such that the electrode 122 is self-releasing from the torch 14.

Starting of the torch 14 will now be described with reference to FIG. 8. Embodiments of the torch 14 includes a "contact starting" mechanism such that the electrode 122 (i.e., the cathode) and the nozzle 118 (i.e., the anode) are in contact with one another during starting of the torch 14. Advantageously, such a contact starting mechanism does not require high frequency (HF) and high voltage (HV) power to start the pilot arc.

Before starting, the spring 126 may bias the electrode 122 in the direction indicated by arrow 156, toward the tip 60 of the torch 14, such that the electrode 122 is in contact with the nozzle 118. The power source 12 may provide a pilot current to cathodic elements, such as the electrode 122, the plunger 110, and the cathode body 124. Additionally, the pilot current is provided to the anode, such as the nozzle 118. After electrical current begins to flow from the electrode 122 (cathode) to the nozzle 118 (anode) of the torch 14, pressurized gas, such as air, supplied to the torch 14 counteracts the spring force and moves the electrode 122 away from the nozzle 118, in the direction indicated by arrow 158 shown in FIG. 9. This breaks the electrical contact between the electrode 122 and the nozzle 118 and creates the pilot arc.

As the electrode 122 moves away from the nozzle 118, it opens a nozzle orifice and a plasma jet is created outward through the orifice of the nozzle 118 and the orifice 116 of the drag shield 54. The plasma jet causes the arc to transfer (at least in part) to the work piece held by the clamp 16, thus initiating cutting. As shown in FIG. 9, the electrode 122 is then biased in the direction indicated by arrow 158 by the gas and plasma pressure at the tip 60 of the torch 14, such that the frustoconical portion 148 of the electrode is received in the recess 150. The electronics in the power source sense when the arc has transferred and then supply a main cutting current of greater amperage after the transfer has occurred. The tip 60 of the torch 14 is disconnected (electrically), interrupting the pilot current path. Thus, the current is used to cut the work piece, and follows a path including the positive terminal, the work piece and the electrode 122. For example, the power unit 12 may be configured to supply a suitable voltage and current to create an electrical circuit from the unit 12, along the cable 15 to the torch 14, across a gap between the torch 14 and a work piece (e.g., as an electrical arc), through the work piece to the clamp 16, through the cable 17 back to the unit 12.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A plasma torch, comprising:
   a torch handle having a central longitudinal axis and being configured to be gripped by a hand of an operator during operation, comprising:
      an enclosure having a bottom portion disposed below the central longitudinal axis and a top portion disposed above the central longitudinal axis, wherein the enclosure is formed from a first material and a second material harder than the first material;

a first contour disposed in the top portion of the enclosure and comprising a curved indentation configured to receive a thumb of the operator, wherein the first contour is formed from the first material; and a second contour disposed in the bottom portion of the enclosure and comprising one or more curved indentations configured to receive a plurality of fingers of the operator, wherein the second contour is formed from the first material.

2. The plasma torch of claim 1, wherein the second contour comprises a first curved indentation, a second curved indentation, and a third curved indentation, each configured to receive a finger of the operator.

3. The plasma torch of claim 1, comprising a torch head coupled to the torch handle in a fixed position relative to the torch handle.

4. The plasma torch of claim 1, wherein the first material comprises a thermoplastic elastomer.

5. The plasma torch of claim 1, comprising a trigger adjacent to the second contour and formed from the second material.

6. The plasma torch of claim 3, wherein the torch head comprises a drag shield, a retaining cup, and a torch body extending into the torch handle.

7. The plasma torch of claim 1, wherein the first contour comprises a flared end configured to abut the thumb of the operator when the thumb of the operator is received in the curved indentation of the first contour.

8. The plasma torch of claim 1, comprising a moveable electrode comprising a frustoconical end portion.

9. The plasma torch of claim 8, comprising a moveable plunger configured to receive a portion of the moveable electrode, wherein the moveable plunger is biased to a first position closer to a tip of the plasma torch when the plasma torch is non-operational and moved to a second position further from the tip when the plasma torch is operational.

10. The plasma torch of claim 9, comprising a spring configured to bias the moveable plunger to the first position.

11. The plasma torch of claim 3, wherein the torch head includes a central longitudinal axis, and an angle between the central longitudinal axis of the torch handle and the central longitudinal axis of the torch head is fixed between approximately 71° and approximately 89°.

12. The plasma torch of claim 3, wherein the torch head includes a central longitudinal axis, and an angle between the central longitudinal axis of the torch handle and the central longitudinal axis of the torch head is fixed at approximately 80°.

13. The plasma torch of claim 6, wherein the drag shield is removably coupled to the retaining cup and the retaining cup is removably coupled to the torch body.

14. The plasma torch of claim 1, comprising a strain relief component coupled to an end of the torch handle.

* * * * *